United States Patent
Bansod et al.

(10) Patent No.: US 7,617,314 B1
(45) Date of Patent: Nov. 10, 2009

(54) HYPERLOCK TECHNIQUE FOR HIGH-SPEED NETWORK DATA MONITORING

(75) Inventors: Shilpa Pradeep Bansod, Cupertino, CA (US); Sanjeevan Raghavendran, San Jose, CA (US); Venkatesh Ramachandran Iyer, Cupertino, CA (US); Michael Richard Valladao, San Jose, CA (US); Jeffrey Y. Sternin, San Jose, CA (US)

(73) Assignee: Network General Technology, George Town (KY)

( * ) Notice: Subject to any disclaimer, the term of this patent is extended or adjusted under 35 U.S.C. 154(b) by 730 days.

(21) Appl. No.: 11/134,808

(22) Filed: May 20, 2005

(51) Int. Cl.
*G06F 15/173* (2006.01)

(52) U.S. Cl. .................................. 709/224

(58) Field of Classification Search .............. 709/219, 709/223, 224
See application file for complete search history.

(56) References Cited

U.S. PATENT DOCUMENTS

| | | | | |
|---|---|---|---|---|
| 5,634,009 | A * | 5/1997 | Iddon et al. | 709/223 |
| 6,269,401 | B1 * | 7/2001 | Fletcher et al. | 709/224 |
| 2003/0023605 | A1 * | 1/2003 | Sternin et al. | 707/100 |
| 2007/0280123 | A1 * | 12/2007 | Atkins et al. | 370/252 |

OTHER PUBLICATIONS

Introducing Network Analysis—Excerpted from Ethereal Packet Sniffing by Angela Orebaugh and Gilbert Ramirez (ISBN: 1-932266-82-8). Copyright 2004, Syngress Publishing, Inc. http://searchenterpriselinux.techtarget.com/searchEnterpriseLinux/downloads/284_EPS_01.pdf.*

* cited by examiner

*Primary Examiner*—Jeffrey Pwu
*Assistant Examiner*—Noel Beharry
(74) *Attorney, Agent, or Firm*—Fenwick & West, LLP

(57) ABSTRACT

In one embodiment, a network architecture includes a plurality of application monitoring modules for monitoring network traffic data in a plurality of network segments. Network monitoring modules include a staging area that receives network traffic data from a packet capture and analysis engine and an indexing area that stores the data in meta-flow tuples with associated measures divided into time interval buckets. Index tables store dimension-based sorted pointers to the storage locations in the data buckets. HyperLock queries collect time aggregated results for measure based operators with respect to a queried dimension. For each value of the queried dimension, the time interval buckets are traversed compiling a partial result that is finally stored in a stack as the time aggregated value. The stored sorted pointers are used to determine the starting location in each bucket with respect to the next value of the queried dimension.

22 Claims, 10 Drawing Sheets

HYPERLOCK TECHNIQUE FOR HIGH-SPEED NETWORK DATA MONITORING

RELATED APPLICATIONS

This application is related to U.S. application Ser. No. 11/133,997 titled "Minimalist Data Collection for High-Speed Network Data Monitoring Based on Protocol Trees" and filed on May 20, 2005, and which is incorporated herein by reference in its entirety.

FIELD OF THE INVENTION

The present invention relates generally to network traffic monitoring and more specifically to HyperLock features for network traffic data analysis and visualization.

BACKGROUND OF THE INVENTION

Networks are used to interconnect multiple devices, such as computing devices, and allow the communication of information between the various interconnected devices. The large impact that information technologies have on our daily lives are primarily enabled by the ability of networks to carry data from one place to another almost instantly. Most people today use data transferred through a network in their daily activities, such as using the Internet to get information, communicate (e.g., with cellular phones, e-mail devices, mobile computing devices, or the like), conduct electronic business, and many other daily activities. In the work environment, many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases, or to collaborate in the preparation of documents. Therefore, a network failure or inefficient operation significantly impacts the ability of enterprises, individuals, or groups to perform their functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another. If a particular network device or network communication link fails or underperforms, multiple devices, or the entire network, may be affected. To avoid network failures or performance problems network monitoring and management tools are provided to mange the networks.

Network management is the process of managing the various network devices and network communication links to provide the necessary network services to the users of the network. Typical network management systems collect information regarding the operation and performance of the network and analyze the collected information to detect problems in the network. For example, a high network utilization or a, high network response time may indicate that the network (or a particular device or link in the network) is approaching an overloaded condition. In an overloaded condition, network devices may be unable to communicate at a reasonable speed, thereby reducing the usefulness of the network. In this situation, it is important to identify the network problem and the source of the problem quickly and effectively such that the proper network operation can be restored.

One purpose of a network is to provide a forum in which applications can pass information from one location to another across the network. These are commonly referred to as networked applications and are typically designed for specific usage. Examples may include mail applications, financial transactions, streaming media, medical imagery, or airline travel reservations. A given corporate or government network may have dozens or thousands of such applications simultaneously in use.

Timely determination and resolution of network failure and/or application performance problems is very important and even critical to the viability of many business enterprises. A network failure can cause very large financial losses. For example, businesses relying on electronic transactions for the sale of products have a critical need for their networks to be operating to enable sales. Even a slowdown of data transfer rates can have a large financial impact due to lower productivity, sales, customer frustration, and the like.

To avoid and quickly resolve network and application problems, operators are required to monitor and troubleshoot network traffic and correlate application performance with network problems. They are also required to perform service-level agreement ("SLA") verification and profile based monitoring for critical entities such as servers and applications. For operators to achieve all these tasks efficiently, traffic data has to be quickly collected, aggregated, and analyzed in a flexible manner. The operator may start down one path and uncover information the leads to an unanticipated problem. As a result, all data should continue to remain available for the user to be able to restart the process of drill down based on the new information.

This typically results in very large datasets and requires slicing, dicing, and pivoting on multiple points of references to view the data from multiple perspectives. Conventional online analytical processing ("OLAP") techniques, such as Multidimensional OLAP ("MOLAP"), Relational OLAP ("ROLAP"), and Hybrid OLAP ("HOLAP"), are data cube based solutions that enable slicing and dicing by providing aggregates on multi-dimensional groups that satisfy some user defined criteria.

However, the data-cube operations require computation of aggregations on all possible combinations of each dimension attribute. As the number of dimensions increases, it becomes very expensive to compute data cubes, because the required computation cost grows exponentially with the increase of dimensions.

In addition, some of the end users, e.g., managers, lower level support, and the like, may not fully understand the aggregate results or be able to use them directly to make a decision. Moreover, executives and managers are typically interested in the most significant asset groups. Several techniques have been proposed for efficient computation of the top N groups. However, they work very well for simple aggregates and are computationally very expensive when computing complex aggregates and the time complexity becomes either $O(n)$ or $O(n^2)$ depending on the number of passes required to aggregate the data.

Accordingly, there is thus a continuing need for a network-monitoring systems and methods for network monitoring and management that can quickly and efficiently compute traffic data aggregations based on any user defined criteria, provide real-time visualizations, and allow slicing and dicing of the data dynamically in order to isolate and find the factors causing network performance problems.

SUMMARY OF THE INVENTION

In accordance with embodiments of the present invention, it is provided a computer based method, computer readable media, and a computer system for monitoring network traffic.

In one embodiment, a method includes generating two or more index tables associated with two or more time intervals. In this embodiment, each index table includes a set of pointers to a corresponding set of storage locations. The storage locations store traffic data captured over the time interval associated with the index table. The traffic data stored in each set of storage locations is organized in a plurality of tuples with associated network traffic measures. Each of these tuples includes a set of dimension values that uniquely identify network communications between two end-points for which data was captured in one time interval. In addition, the set of pointers in each index table are sorted based on the values in the tuples in one set of storage locations for one of the dimensions.

The method further includes aggregating partial results in response to a query. The query is referenced with respect to a dimension and it requests a time aggregated result based on the network traffic measures. In response to the query, the method aggregates partial results based on the network traffic measures in the multiple sets of storage locations into the time aggregated result by accessing the storage locations storing the traffic data captured over the different time intervals following the order of the pointers in each index table.

According to another embodiment, it is provided a network monitoring appliance for monitoring network traffic. The network monitoring appliance includes a network data staging area, a network data indexing area, and a processing unit.

In one embodiment, the network data staging area is configured to receive network traffic data from a packet classification and analysis engine. The network data staging area receives the network traffic data in two or more time based data storage buckets. Each data storage bucket is associated with a timer that causes them to rotate over time. Similarly, a network data indexing area includes sets of storage locations for storing traffic data. Each set of storage locations stores data captured over a time interval. The indexing area is coupled to the staging area for periodically updating the traffic data. The traffic data that is being stored in the bucket currently in use is updated with data from the staging area one or more times within a time interval. In addition, the indexing area is also configured to store index tables associated with each of the time intervals. Each index table is intended for storing a set of pointers to corresponding storage locations in a set storing the data for the time interval associated with index table.

In this embodiment, the network monitoring appliance also includes a processing unit. The processing unit is configured to receive a query from a monitoring console. The query includes a query dimension and it requests a time aggregated result with respect to that dimension. The time aggregated result is based on network traffic measures stored in the storage locations. To provide the time aggregated result, the processing unit aggregates partial results from the sets of storage locations. The processing unit access the storage locations based on the pointers in the index tables.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. ("FIG.") 1 shows a generic illustration of a network architecture according to one embodiment.

DETAILED DESCRIPTION OF PREFERRED EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. For purposes of this discussion, blocks of flowchart illustrations, combinations of blocks in flowcharts, or any other functional description of elements or modules of the embodiments should be understood to be implemented in software, hardware or any combination thereof. When implemented as software, the computer program instructions may be provided to a computer processor or other programmable data processing apparatus to produce a machine that operates as described. These computer program instructions may also be stored in any computer-readable media that can direct a processor or other programmable data processing apparatus to function as described herein, such that the instructions stored in computer-readable media produce articles of manufacture including program instructions that implement the functions described.

Network Infrastructure

Figure 1:
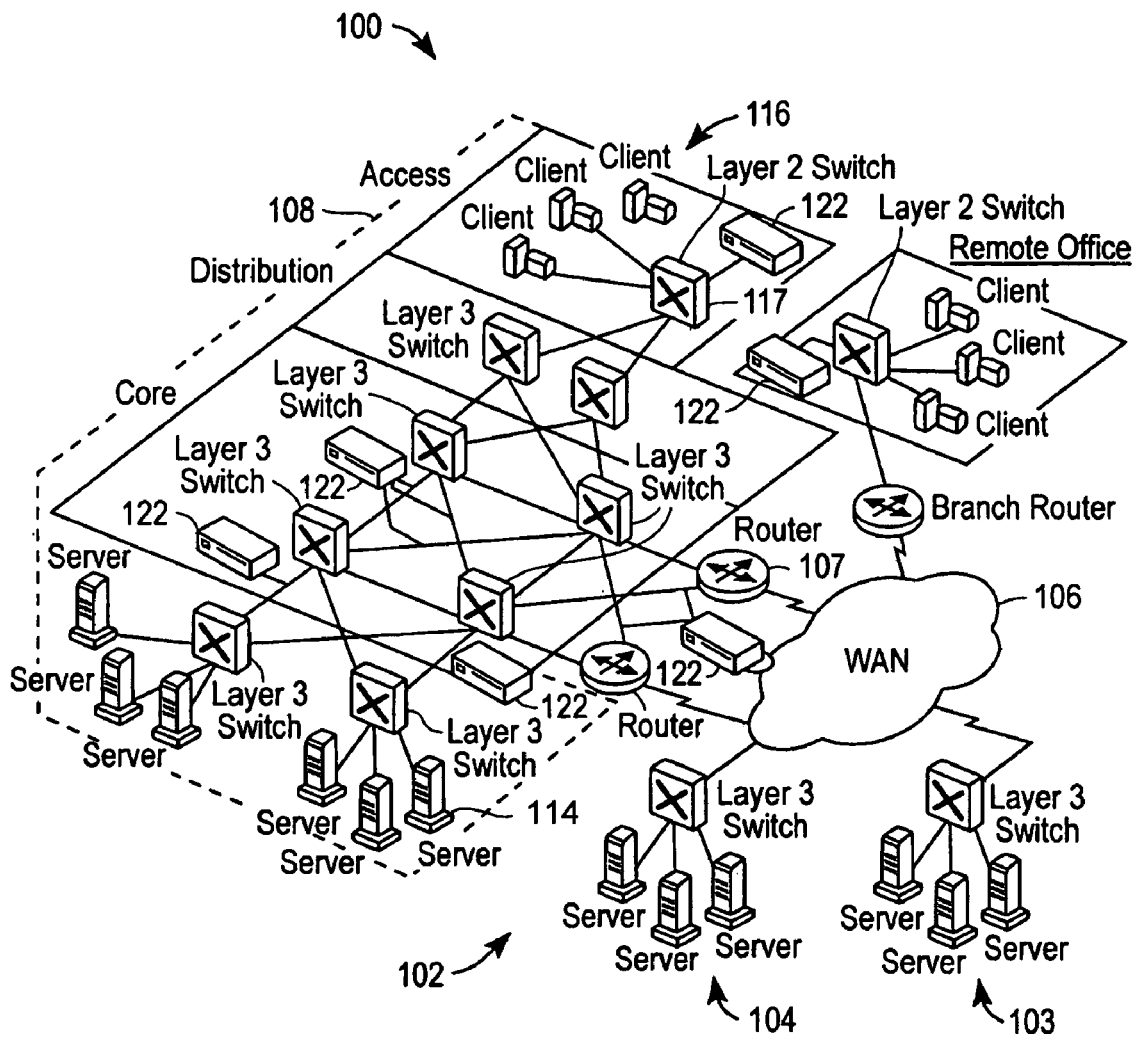

FIG. 1 shows a generic illustration of a network architecture according to one embodiment. In this embodiment, a plurality of remote networks 102 are provided, including a first remote network 103, and a second or more remote networks 104, 106 (generally 102). Also included is at least one gateway 107 coupled between the remote networks 102 and a proximate or enterprise network 108. In the context of the present network architecture 100, the networks 103, 104, 106 may each take any form including, but not limited to a local area network (LAN), a wide area network (WAN) such as the Internet, etc.

Gateway 107 serves as an entrance point from the remote networks 102 to the proximate network 108. As such, the gateway 107 may function as a router, which is capable of directing a given packet of data that arrives at the gateway 107, and a switch, which furnishes the actual path in and out of the gateway 107 for a given packet.

Further included is one or more data servers 114 coupled to the proximate or enterprise network 108. Data servers 114 are accessible from the remote networks 102 via the one or more gateways 107. It should be noted that the data server(s) 114 may include any type of computing device/groupware. Preferably, coupled to data servers 114 are a plurality of client devices 116. Such client devices 116 may include desktop computers, lap-top computers, hand-held computers, printers or any other type of logic or computing devices. It should be noted that client devices 116 may be directly coupled to servers 114, which provide access for clients 116 to the network 108/102 or may have direct access to the network 108/102 via a gateway/router switch 117.

In one embodiment, a distributed monitoring system is coupled to the enterprise network 108 at one or more network segments. One or more network monitoring devices 122, such as for example, Sniffer® Distributed s4000 or s6000 modules by Network General Corporation, of San Jose, Calif., are deployed throughout critical segments of the enterprise network 108. Network monitoring devices 122 may be coupled to network elements such as routers, gateways, and the like. It should be noted that additional monitoring systems and/or components thereof may be utilized with any type of network element coupled to the networks 103, 104, 106, 108. In the context of the present description, a network element may refer to any component of a network.

Figure 2:
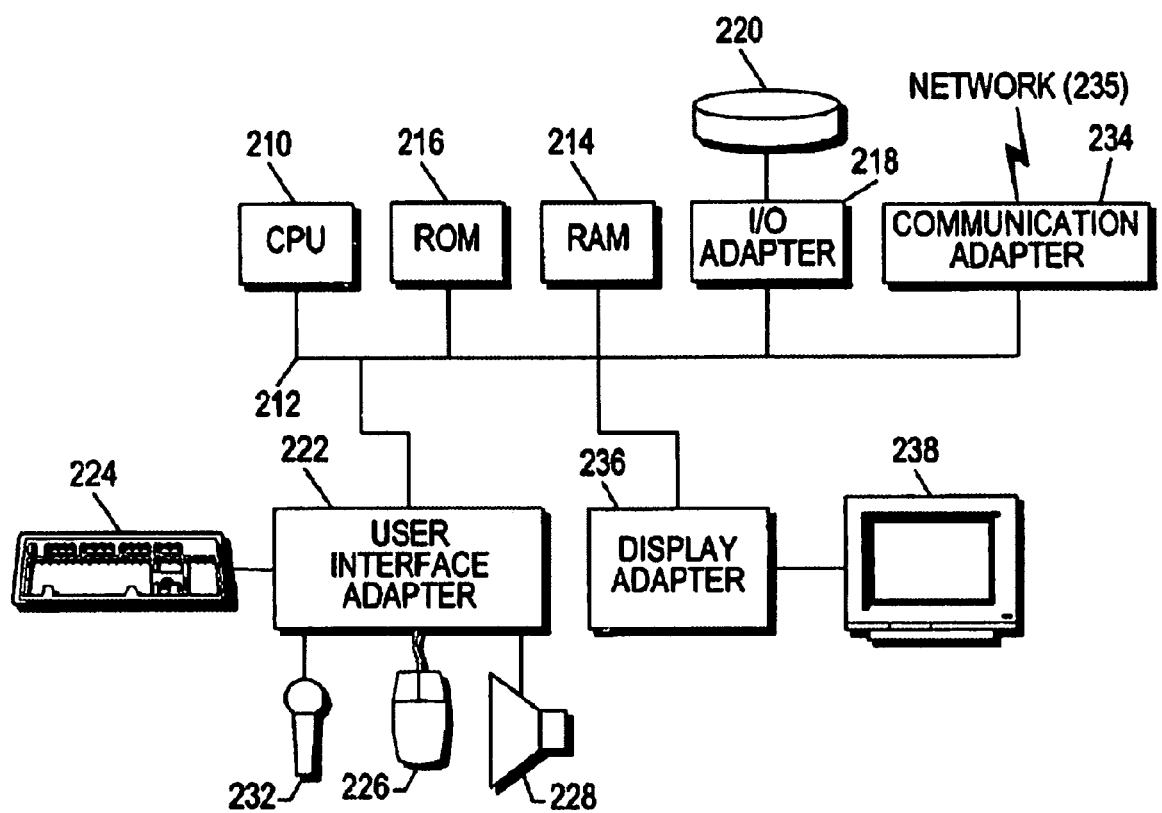
FIG. 2 shows a block diagram of a representative hardware environment of a sample end-point network device in accordance with one embodiment.

FIG. 2 shows a block diagram of a representative hardware environment of a sample end-point network device in accordance with one embodiment. In one embodiment, the representative hardware environment shown may be associated with, for example, a client device 116 of FIG. 1. Such figure illustrates a typical hardware-configuration of a workstation having one or more central processing units 210, such as microprocessors, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows®NT, Microsoft Windows®2000, XP, or any other Microsoft® based Operating System (OS), the MAC® OS, or UNIX/Linux operating system. It will be appreciated that a preferred embodiment may also be implemented on platforms and operating systems other than those mentioned. A preferred embodiment may be written using XML, JAVA, C, and/or C++ language, or other programming languages, along with an object oriented programming methodology. Object oriented programming ("OOP") has become increasingly used to develop complex applications.

The following sections provide a high-level description of an architecture for network monitoring and management system according to one embodiment. The system includes a set of application monitoring and management tools that provide monitoring for business critical applications and network performance information to administrators such as chief information officers ("CIOs") and enterprise network managers.

Network Monitoring Devices

According to one embodiment, the system provides distributed multi-segment network monitoring and correlation functions, with a focus on protocol to application performance monitoring. This multi-segment capability can be extended to multi-site monitoring and correlation (e.g. nodes placed at different geographical locations). The system is preferably based on a scalable, high-performance, open architecture, which can be easily adapted to support many different topologies and features.

Figure 3:
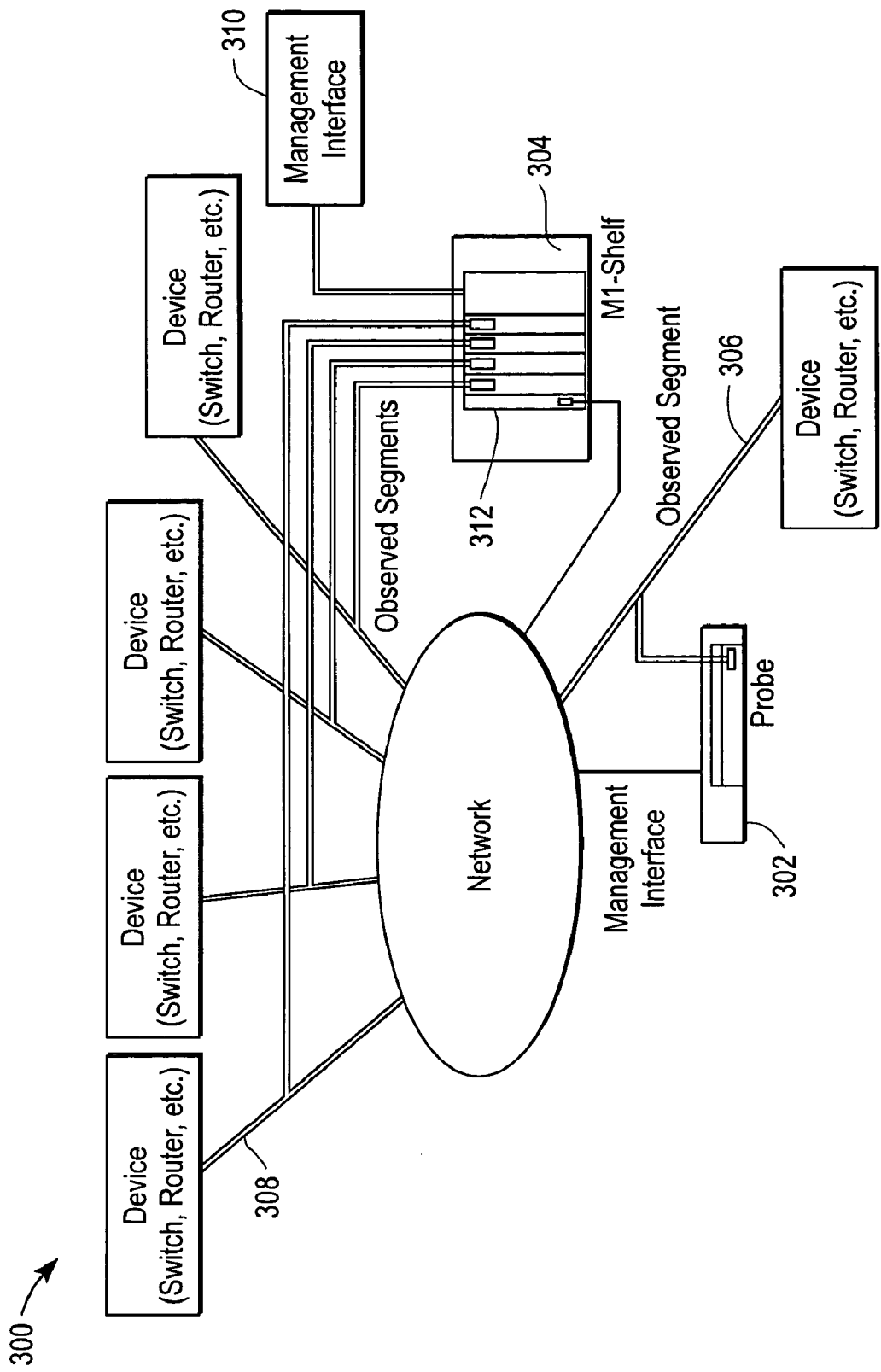
FIG. 3 shows a block diagram of a sample application monitoring system according to one embodiment.

FIG. 3 shows a block diagram of a sample application monitoring system according to one embodiment. The block diagram illustrates one embodiment of an Application Monitoring system 300. As shown, the system 300 can include single-interface probe topologies, multi-interface distributed topologies, or any combination thereof.

For a single-interface probe topology, a single interface probe network monitoring device 302 is attached to a network port of a network device to monitor traffic in the associated segment 306. For example, in one embodiment, a portable microprocessor-based computing device with a 10-base T Ethernet connector and packet capturing and processing software is configured to probe a network segment upon reporting of a problem with a device attached to the segment in question. One example of such a system is Sniffer® Portable, by Network General Corporation, of San Jose, Calif., which provides these easy deployment capabilities for monitoring network segments as needed.

In an alternative embodiment, a multiple interface probe distributed monitoring system 304 includes a rack-type system with a plurality of multi-port network monitoring devices 312 coupled through hardwired or wireless connections to several network segments 308 for traffic capturing and observation. A management interface 310 provides access to the traffic data collected by the monitoring devices 312 and for further processing and visualization as described herein.

Preferably, regardless of the topology deployed, the system 300 may include two components: an application server module and one or more monitoring modules 302/312. The role of the monitoring modules 302/312 is to provide a physical observation point of network traffic on a given segment 306/308. The application server may be included in the management interface 310 to provide administrative functions (i.e. user interface, provisioning, reports, alarms and statistics, Simple Network Management Protocol (SNMP) agent, etc.) for the system 300. For example, in a single-interface configuration, a single monitoring interface is available in a self-contained, managed device, similar to a typical Remote Network Monitoring (RMON) probe.

In the multi-interface configuration, a larger system is possible by providing multiple interfaces (monitoring devices 312), which allows monitoring and real-time correlation of multiple (co-located) network segments 308. Preferably, in both arrangements, no higher-layer management console is required. The distributed configuration also allows the mixing and matching of different monitoring module types (e.g., Sniffer® s4000, s6000, or the like). One exemplary benefit of this configuration would be to monitor traffic seen on the WAN-side of a router, on a backbone, and on individual branch segments all from the same system, providing a complete network view from a single administrative point.

Figure 4:
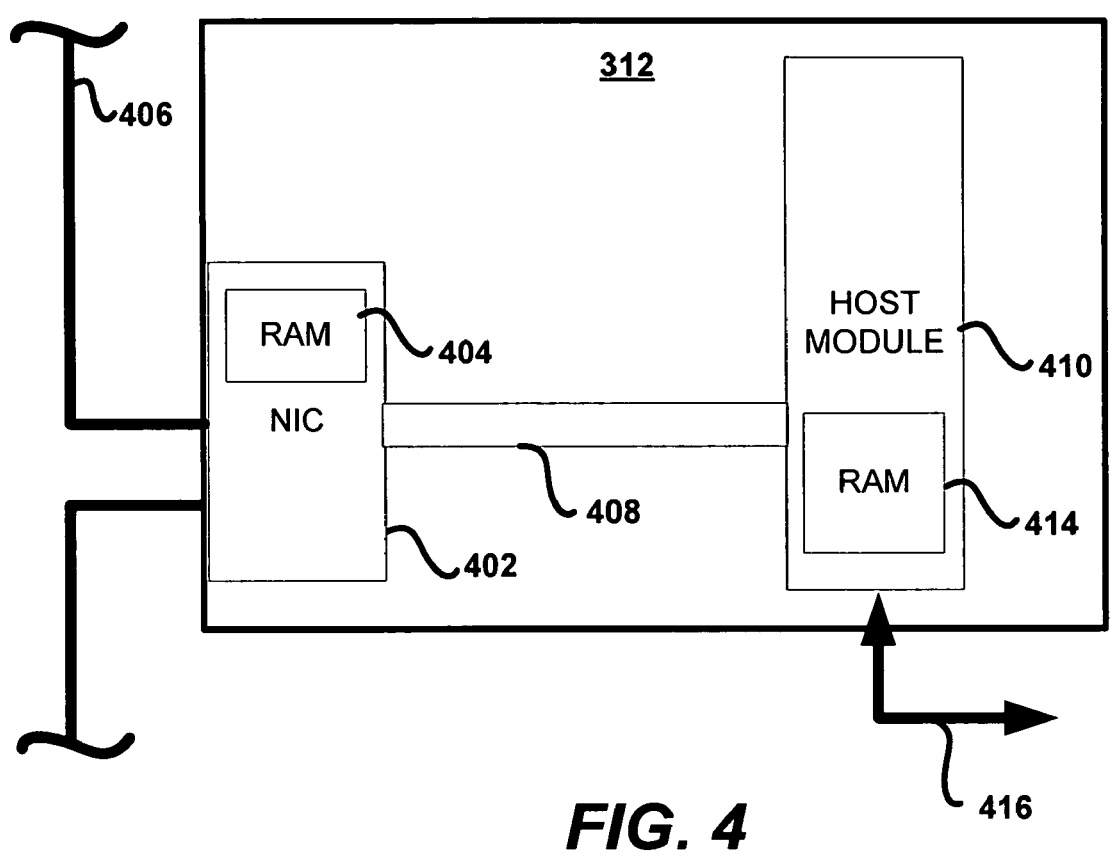
FIG. 4 shows a functional block diagram illustrating a network monitoring appliance according to one embodiment.

Now referring to FIG. 4, a functional block diagram illustrating a network monitoring appliance according to one embodiment is shown. The monitoring device 312 is connected to the network in an inline configuration, a physical transmission medium 406 of the network segment, e.g., an Ethernet cable, is spliced into the device 312. Although for illustration purposes an inline configuration is shown, it should be noted that other configurations, e.g., tap, wireless, or the like are possible as would be understood by a person of ordinary skill in the art. The network transmission medium 406 is connected to a processing module 402, e.g., a network interface card ("NIC"). The processing module includes hardware to electrically couple the network transmission medium 406 to the monitoring device 312 for receiving network traffic data. The network processing module may include conventional Ethernet networking, IEEE 802.11 wireless networking, or any other desired networking protocol capabilities. The processing module 402 includes a local data storage device 404, e.g., random access memory ("RAM") or the like.

The processing module 402 is connected to a host module 410 through a connection circuit 408, e.g., a bus. In one embodiment, the connection between the two modules is a high speed interconnect circuit such as a Peripheral Component Interconnect ("PCI"), PCI-X, serial peripheral interface ("SPI"), SPI-3, SPI-4, or the like. Preferably, the host module 410 is a processor based device, such as a microprocessor, embedded processor, multi-processor subsystem, a field programmable gate array ("FPGA") chipset, or the like. The host module 410 includes a local memory device 414. Preferably, the local memory device 414 is a fast access memory device, e.g., RAM, flash memory, or the like. In one embodiment, the host module 410 is coupled to a visualization module (not shown) through a data bus 416 to access traffic data, e.g., directly from the local memory device 414.

Network Traffic Data Collection and Cubing

Figure 5:
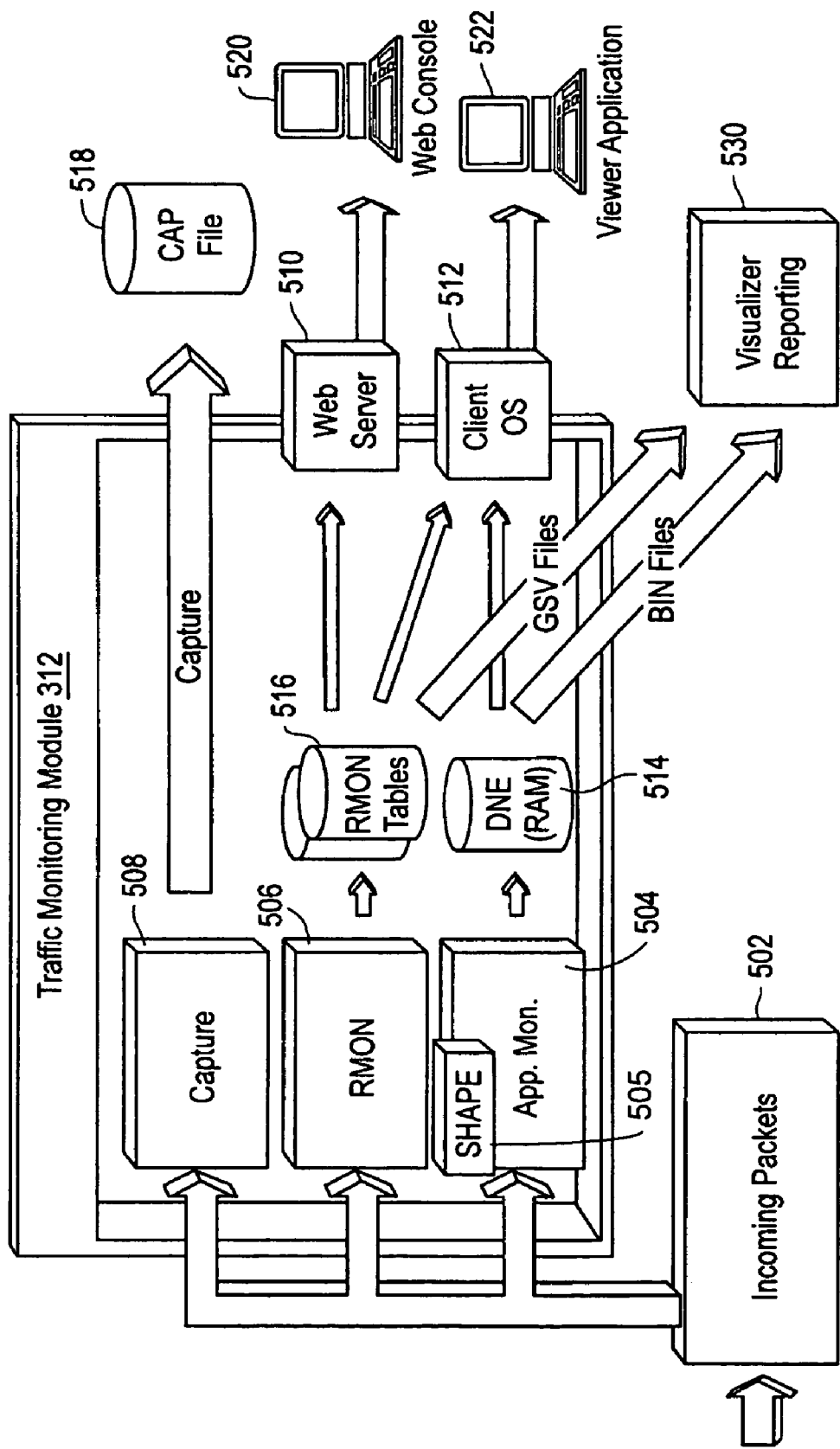
FIG. 5 shows a dataflow diagram in a traffic monitoring module according to one embodiment.

Now referring to FIG. 5, a dataflow diagram in a traffic monitoring module according to one embodiment is shown. Network monitoring devices 312 may collect and monitor network traffic data for multiple purposes. With respect to one embodiment, the packet data 502 is received and distributed to one or more modules, optionally including an application monitoring module 504, a conventional remote monitoring ("RMON") module 506, and a capture module 508.

The capture module 508 captures and formats the packet data in a predefined format, e.g., according to .cap file structure, and sends the data to a packet store database 518. The packet database 518 may be accessed by applications to for example review traffic in a segment after a failure occurred.

The RMON module 506 arranges and stores the packet data into conventional RMON tables 516 for remote monitoring through a web server 510 accessible to a user through a web console or browser 520. Alternatively, the RMON tables 516 may be accessed through a client operating system ("OS") 512 by a user viewer application 522 for remote monitoring.

The Application Monitoring Module 504 collects and aggregates packet data according to one embodiment. The Application Monitoring Module 504 includes a packet classification and analysis ("PCA") engine 505. In one embodiment, the PCA engine 505 may operate in the module's kernel to track network flows, create data structures in a "master table" for the flows, and collect information about the flows, such as IP addresses of end points, TCP/UDP port numbers, virtual circuit identifiers, and the like. The PCA engine 505 may also perform deep sub-classification of user applications found in the traffic and calculates response time metrics for the flows. For example, one example of a PCA engine 505 includes the Sniffer Hybrid Application Performance Engine ("SHAPE") by Network General Corporation, of San Jose, Calif. The flow data is collected from the master table, organized and stored in a data normalization engine ("DNE") 514, preferably in memory, e.g., RAM, for fast access and querying. The DNE 514 may be accessed by a client OS 512 for interaction with a user viewer application 522. Alternatively, in one embodiment, the DNE 514 data is stored in project data files, e.g., .bin files, for subsequent access by visualizing and reporting modules 530, for example, in a multi-segment system.

Figure 6:
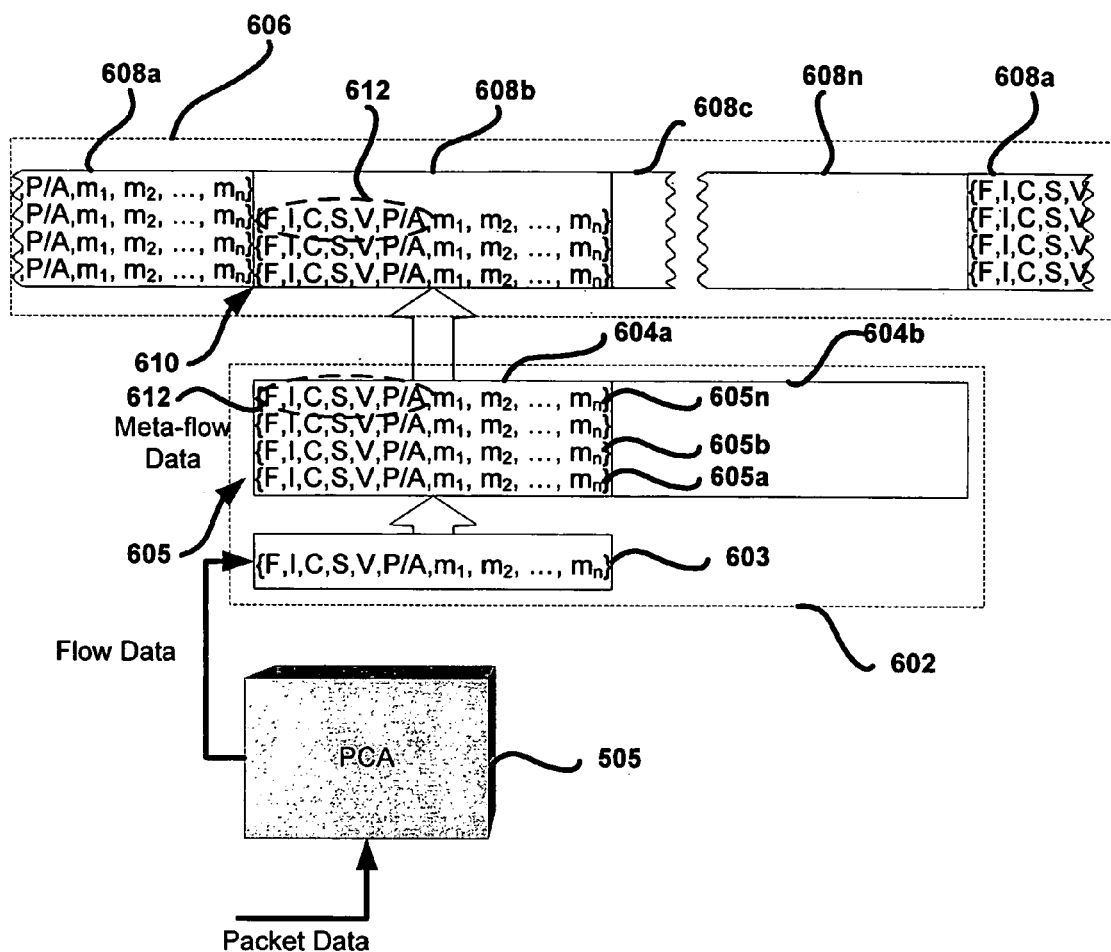
FIG. 6 shows a data flow diagram illustrating data flow in staging and indexing areas according to one embodiment.

Now referring to FIG. 6, a data flow diagram illustrating data flow in staging and indexing areas according to one embodiment is shown. In this embodiment, an Application Monitoring Module 504 includes a master table staging area 602 in a first level store, e.g., RAM in a NIC, for the initial aggregation of flow data received from the PCA engine 505. Preferably, the staging area 602 operates at the kernel level for fast collection of traffic data from the PCA engine 505. The staging area 602 includes a set of buffers or time buckets 604 to contain the data collected from the PCA engine 505. Optionally, an input buffer 603 may receive flow data from the PCA engine 505 and transfer the flow data in a corresponding meta-flow in the time bucket 604 while aggregating the measures for each meta-flow.

The time buckets 604 (a and b) are used to maintain the temporal integrity of the traffic data. Instead of computing delta values or snapshots and aggregate them to existing values, time buckets 604 collect traffic data alternating in time. Timers are associated with each time bucket 604 such that when the timer reaches a pre-set value, an available time bucket 604 is rotated into collection and the previous time bucket 604 is rotated out. Preferably, the pre-set timer value for the time buckets 604 is programmable to any desired value. Similarly, the number of time buckets 604 in the staging area 604 may be variable; this number may be set by a user according to the available storage or memory. In one embodiment, the stating area 602 includes two time buckets 604a and 604b configured to store five minutes of incoming traffic data in a round robin basis, flip flopping from one to the other every five minutes. As the flow traffic data is received from the PCA engine 505, it is aggregated into unique meta-flows representative of network conversations between two endpoints. This approach aids in space efficiency because measures associated with the traffic, e.g., response time, need not be maintained for each dimension of the traffic flows as is further described below.

Within each time interval I, as flow data is received from the PCA engine 505, a set of dimension values are examined to determine a tuple 612 that uniquely identifies a meta-flow corresponding to a conversation between two network endpoints. For each tuple 612 determined, if the tuple 612 is not already in the current bucket 604, a new row 605 is created. If the tuple 612 already exists, the measures for the tuple 612 are updated by aggregating the flow value with the existing value, either by adding or otherwise calculating the corresponding measure, e.g., min/max, and the like. In one embodiment, the tuple-based data aggregation process is similar to the tuple-based data aggregation process for protocol tables described in U.S. Pat. No. 6,751,627, to Sternin, (Jun. 15, 2004), titled "Method and Apparatus to Facilitate Accessing Data in Network Management Protocol Tables," assigned to the assignee of this invention, and incorporated herein by reference.

Periodically, the data from the current time bucket 604 is exported into a secondary storage or memory. For this purpose, the staging area 602 is communicatively coupled to an indexing area 606. In one embodiment, the value for the bucket timer sets a time interval (I) that is subdivided in k smaller sub-interval update periods (SI), such that $I=\Sigma(SI_1, SI_2, \ldots, SI_k)$. For example, using a five minute timer time, every minute the data in the indexing area 606 is updated with the data in the current time bucket 604. In one embodiment, the update period in effect becomes the refresh rate at which data is displayed and accessible for the user. Preferably, the update period may be a reprogrammable variable or otherwise user definable in order to provide customization that may take into account performance requirements and/or system resources.

In one embodiment, the indexing area 606 collects the meta-flow traffic data from the stating area 602 into multidimensional arrays or cubes (n-cube, where n denotes the dimensionality). The n-cube indexing area 606 also includes a plurality of time interval buckets 608. For example, each time interval bucket 608 corresponds to five, fifteen, or some other time period, which may be provided for selection or be customizable by the user. Preferably, the time period associated with the indexing area time interval buckets 608 corresponds to the timer pre-set value of the staging area buckets 604.

Preferably, the n-cube indexing area 606 may be implemented in a rotating window fashion in which the time interval bucket 608a that was used first to import data from the staging area 602 is discarded when the last time interval bucket 608n is used up, i.e., storing the traffic data in the time interval buckets 608 in a rotating fashion. For example, in one embodiment, the n-cube indexing area 606 includes 24 five-minute time interval buckets 608 for a total storage time of two hours. Accordingly, after two hours, the data stored in the first time interval bucket 608a is discarded and the first time interval bucket 608a is reused for storing the next five minutes of data, corresponding to the first five minutes after two hours. Because the traffic data for the previous two hours is stored, a time interval (I) can be specified in a user query to examine the data associated with that time interval stored in the corresponding time interval bucket 608. Thus, according to this embodiment, the time interval (I) becomes one of the index dimensions of the n-cube indexing area 606.

Within each time interval bucket 608, a plurality of cells 610 store tuples of traffic data and corresponding measures. Each unique tuple defines a meta-flow representative of a conversation between two end points in the network. In one embodiment, a tuple 612 includes a set of dimensions with variable values. For example, tuple dimensions may include clients ("C"), servers ("S"), protocol ("P"), application ("A"), virtual circuit ("V"), network segment ("F"), time interval ("I"), and the like, including combinations thereof. For example, in one embodiment, a single dimension is used for the protocol or application value, i.e., protocol/application ("P/A") dimension. For clients and servers the tuple values may include an internet protocol ("IP") address, medium access control ("MAC") address, a machine network name, or the like. Likewise, in one embodiment corresponding network traffic measures for the meta-flows may include response time, server delay, network time, number of retransmissions, packet size distribution, byte and packet counters, and the like.

According to an alternative embodiment, memory pointers are shared between the staging area 602 and indexing area 606 to avoid memory copying. The pointers can be shared via shared memory pages of a duration equal to the update period SI. Thus, the current buckets 604 and 608 would in essence correspond to the same data without the need to copy. Upon bucket rotation when the interval period I timer expires, the memory ceases to be shared with the current bucket and the next bucket begins sharing. Moreover, in one embodiment, to further optimize memory usage, variable length encoding (VLE) is used to compress the raw traffic data.

Multi-Way Fast Indexing

As described above, the time interval bucket 608 data is recreated with the meta-flow data from the staging area bucket 604 periodically, e.g., every one minute. In addition, within each time interval, metadata for each new or existing meta-flow is also created for each sub-interval update period SI. In one embodiment, the metadata for each meta-flow provides a fast indexing technique further described below with respect to FIG. 7.

Figure 7:
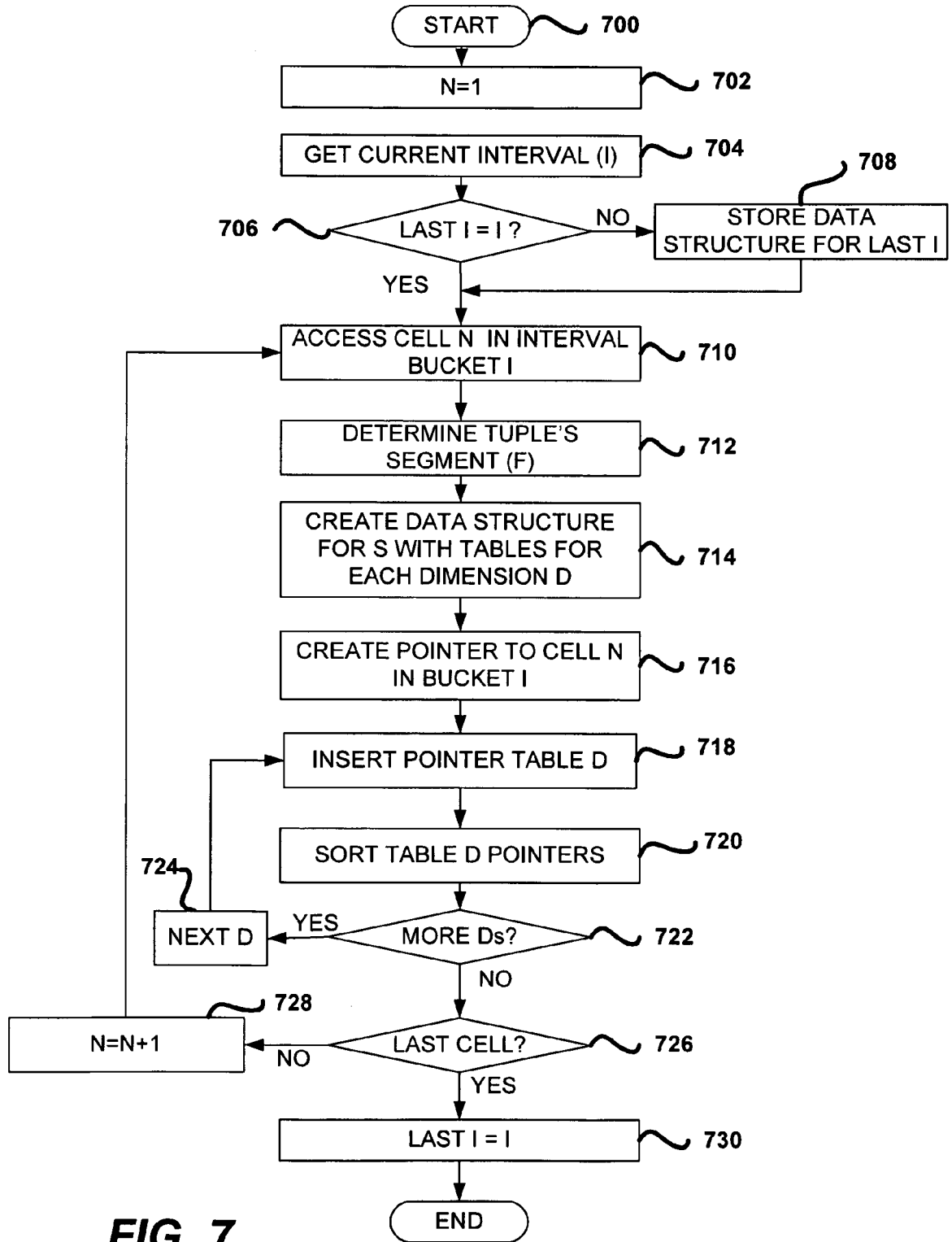
FIG. 7 shows a flow diagram illustrating a method for capturing and storing network traffic data according to one embodiment.

Now referring FIG. 7, a flow diagram illustrating a method for capturing and storing network traffic data according to one embodiment is shown. The method starts 700 triggered after each periodic update from the staging area 602 to the indexing area 606, i.e., after every sub-interval period SI. A local variable N is initialized 702 to point to the first cell or statistical row in the current time interval bucket. The current interval value I is determined 704 and compared 706 with the last interval value processed. If the interval value I is different, i.e., a new bucket has been updated this SI interval, the data structure last created is stored 708 maintaining its association with the previous time interval bucket. If the current interval I is the same as the last interval, the (first) N cell or row in the interval bucket is accessed 710.

The value of the segment F associated with the tuple stored in this cell (tuple$_N$) is determined 712. A data structure is created 714 dimensioned to store several sets of pointers. The number of pointers is equal to the total number of rows or cells in the current time interval bucket. In addition, a table or array is created for each desired index dimension D. Preferably, the data structure is dimensioned for a plurality of dimensions-based index tables TD, each dimensioned to store the set of pointers sorted according to the values of its corresponding dimension D. In one embodiment, the data structure includes a three-way temporal index array Arr[i] where, $\forall(I[i])\exists Arr[i]$ and max size of Arr[i]=f(bucket size)

such that $Arr[i] \subseteq \{F,I,C,S,V,P/A\}$ (tuple$_N$)

For example, in one embodiment a client table, a server table, and a virtual circuit table are created 714 as part of a "fast indexing" three-way temporal index array. Each table is dimensioned to store a pointer to each of the rows in the current time interval bucket. Thus, the data structure provides a partially ordered index the helps speed up data accessing techniques further described below.

In addition, in one embodiment the data structure may include a set of dimension-based index tables for each of the values possible with respect to yet another dimension. In this embodiment, the data structure provides a hierarchical dimensional index. For example, as shown in FIG. 7, in one embodiment dimension-based index tables are created for each segment (F) of the network being monitored. In such an embodiment a multi-way fast indexing scheme is provided.

Preferably, the indexing dimensions D are selected so as to summarize the most data by means of the index tables. For example, clients and servers are likely to be shared among large numbers of meta-flows, thus these two dimensions provide deep indexes summarizing much of the data. It should be noted however that any and all of the dimensions in the tuple may be selected for indexing according to the techniques described. In addition, the indexing dimensions may be selected based on the most likely dimensions users will want to display the monitored measures.

In this embodiment, once the data structure is created 714, a pointer to the memory location storing cell N in the current bucket is created 716. The pointer is inserted 718 in the dimension-based table for dimension D (TD). And the pointers in TD are sorted 720. As long as there are 722 more indexing dimensions D, this process is repeated 724 with respect to each of the index dimensions D, e.g., client table, server table, virtual circuit table, and the like.

Preferably in conjunction with the insertion 718, the pointers in each table are sorted 720 simultaneously, for example by using an in-place insertion-sort technique. Alternatively, in one embodiment the pointers in each table may be sorted 720 after each insertion 718. Yet in another embodiment, the pointers in each table are sorted 720 after all the pointers have been inserted 718. Each set of pointers is sorted with respect to the value of the dimension D of the index table. For example, for a client table, the pointers are sorted in ascending order based on IP or MAC address of the client, and similarly for the server table. The values are stored in the current time interval bucket but the rows of the bucket are not sorted, only the pointers pointing to the rows are sorted in each table according to the values of the corresponding indexing dimensions.

For each cell N in the time interval bucket, the local variable N is updated 728 and the process is repeated from the cell accessing step 710 on. Once the last cell is reached 726, the interval value I is stored 730 in a local variable, e.g., "LAST I," to be compared 706 with the next interval value as described above. Thus, the "fast indexing" data structure with the dimensioned-based sorted pointer tables is recreated every sub-interval SI until the end of the interval is reached. At that point, the fast indexing data structure remains unchanged and stored as long as the indexing area buckets are maintained, e.g., two hours.

By one of example, in one embodiment, the indexed-cubing technique described above works on the meta-flow data collected into the time interval bucket of the indexing area to create the following 3-way fast indexes:

1) Per Interval (I)—Per Segment (F)—Clients (C): {I:F:C}
2) Per Interval (I)—Per Segment (F)—Servers (S): {I:F:S}
3) Per Interval (I)—Per Segment (F)—Virtual Circuits (V): {I:F:V}

In this embodiment, the dimensions C, S, and V present themselves in large numbers, and are therefore selected for fast indexing. Each entry in the fast index table points to a row in the bucket for that interval that contains that dimension. Hence, there are as many index table entries in an interval as there are rows in the bucket for that interval. The fast indices are sorted on the last dimension, i.e., C, S, and V respectively. As further described below, the dimension-based sorting will be relevant for aggregation across time intervals I.

It should be noted that some of the details of the implementation illustrated in FIG. 7 are simply design choices described for illustrative purposes. Alternative implementations are possible to accomplish the same functions.

Hyperlock and Rollup Features

As described above, in one embodiment the meta-flow traffic data is stored in the indexing area (or DNE) for a period of time, e.g., several hours, days, or any other desired time (memory permitting) divided in several time period buckets of any desired duration, and constantly being updated with new traffic data from the stating area every SI update period, giving a real-time access to the user.

To enable the user fast and efficient slicing and dicing of the large amount of meta-flow data available in the DNE, the fast indexing data structures are used to provide HyperLock features. The HyperLock features include rollup, drill down, and aggregation techniques that allow users to pivot and re-orient the meta-flow traffic data, or a desired subset, on a display very quickly. A sample multi-dimension aggregation and drill down technique according to one embodiment is described with reference to FIG. 8.

Figure 8:
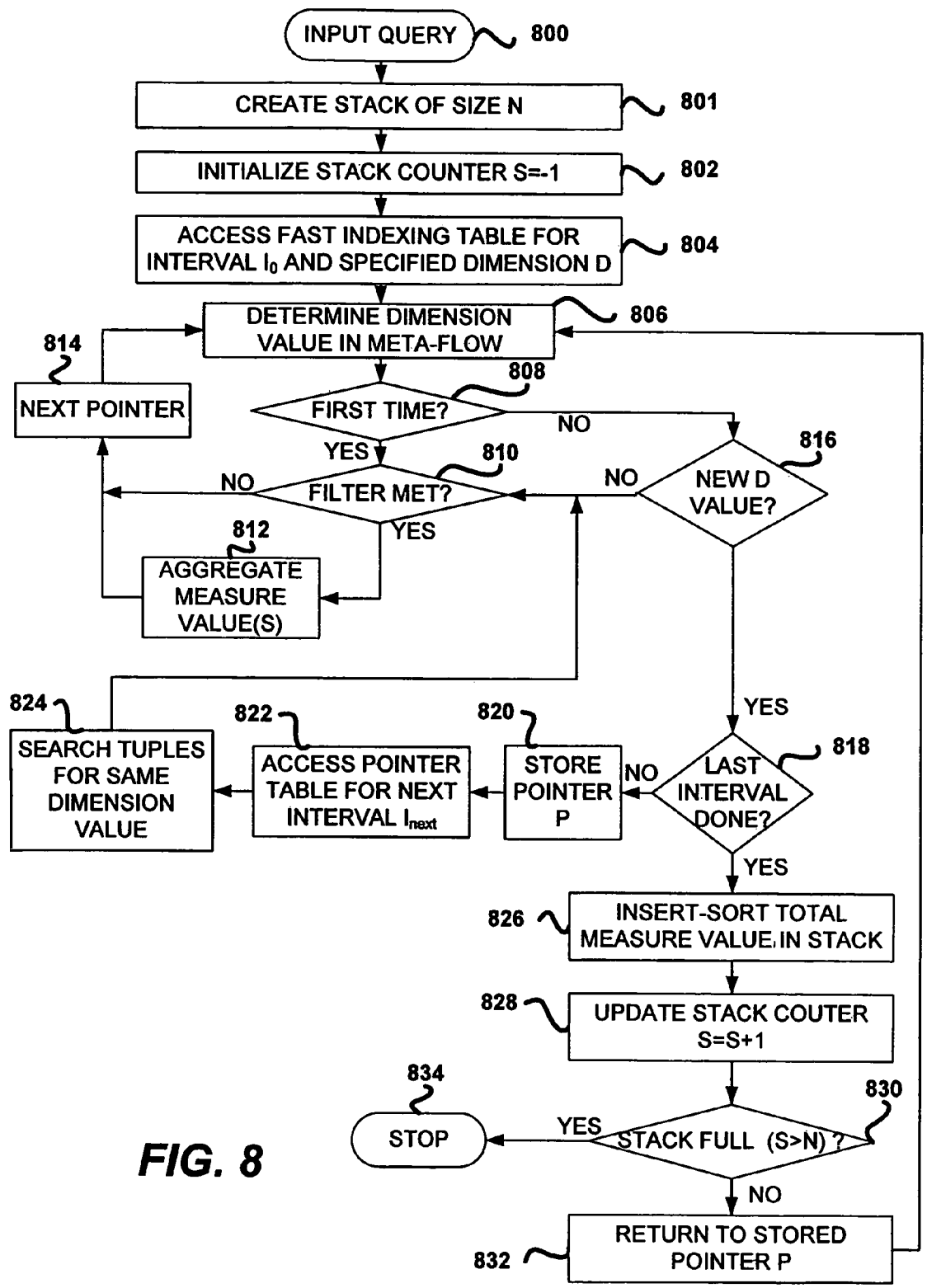
FIG. 8 shows a flow diagram illustrating a method for monitoring network traffic according to one embodiment.

Now referring to FIG. 8, a flow diagram illustrating a method for monitoring network traffic according to one embodiment is shown. The method starts 800 with an input query. Preferably, a default set of queries are provided to generate a standard set of displays as for example shown in FIG. 9, e.g., top ten servers, top 100 clients, and the like. Preferably, the default queries, or a subset thereof, may be executed every SI update interval to maintain a real-time display of the traffic data in a management/monitoring console.

Generally, queries include designations for the desired group (e.g., top or bottom, best performing, fastest, slowest, or the like). A quantifier N specifies the size of the resulting sample, e.g., top 10, fastest 100, and the like). Next a dimension D can be specified to qualify the nature of the resulting group to be displayed. The operator OP with respect to which the query is run is also specified. The operator may be simply one of the measures available in the traffic data indexing area or may be a combination of measures based on a arithmetical/logical operator computed over available measures. In addition, a filter can also be optionally included to limit the results to a particular set of meta-flows that meet the filter criteria. For example, one or more dimension values can be specified for one or more desired dimensions. In one embodiment, the filter is logically ORed for values within the same dimension and logically ANDed across dimensions specified in the filter. In addition, as an option any number of additional measures can be specified for display. One example of a generalized query statement may be given as follows:

Query=[TOP/BOTTOM] [N] [DIMENSION] BY [OP] FOR [FILTER] WITH [MEASURES]

For example, a query may be for the top 10 servers by total packets for servers with more than 200,000 total packets (additional measures, like response time, server delay, no. of retransmissions, or the like, may also be requested for display).

Referring back to FIG. 8, in one embodiment, upon receipt 800 of a query, a stack of a size determined by the query (N) is created 801, e.g., top 10 means N=10, and a stack counter (S) is initialized 802. The fast indexing data structures are accessed 804 with respect to a first time interval $I_0$, e.g., the oldest interval in time, and for the dimension D specified in the query. The DNE memory location pointed to by the first pointer in the table is accessed to determine 806 the value for that dimension D. The first time accessing the DNE 808, if the filter conditions, if any, are met 810, the operator OP is applied to the appropriate measures and its result is stored 812 in a temporary memory location. In addition, if the query specifies additional measures to be displayed, e.g., [MEASURES], temporary memory locations are created for storing those measures and the measures are stored too. Then the next pointer is found 814 and the process is repeated from step 806.

After the first time the process is implemented 808, the value determined 806 for the dimension D is checked 816 to determine if it has changed from the previous value. For as long as the value does not change, the process is repeated checking 810 the filter conditions and aggregating with the previous measure/operator values within the same time interval (I).

Once a new value for the queried dimension D is found 816 in the current interval I, as long as the current interval is not 818 the last, e.g., most recent, interval I, the pointer value is stored 820 in a temporary pointer store P. The fast indexing table for the next interval $I_{next}$ for the specified dimension is accessed 822. The pointers in that table are used to access the corresponding interval bucket in the indexing area to find 824 the same value for the queried dimension D. Once the desired value is found 824, the filter is evaluated 810 and the process repeats traversing down the fast indexing pointer table for the interval until a new value for D is found 816. Because the pointers are sorted by the queried dimension D, once the first pointer to the appropriate value is found, only subsequent pointers could point to the same value. Thus the this process traverses from interval bucket to interval bucket in the indexing area aggregating the operator values from the multiple interval periods with respect to each value for the queried dimension D.

When every interval I has been accessed 818 aggregating the operator/measure values, the total aggregated value is inserted 826 in the appropriate position in the stack, depending on whether the "top" or "bottom" group was queried for. The insertion may preferably be a sorted insertion; however, a quick sort of the stack may be done after each insertion. Once the final operator/measure values are inserted in the stack, the stack counter is updated 828, and if it exceeds 830 the total size N, the process ends 834 because the top or bottom group of size N has been already determined. Otherwise, the process is repeated going back 832 to the stored pointer P in the corresponding interval and aggregating operator/measure values for the next value of the queried dimension D across all intervals until the stack is full 830.

According to another embodiment, multiple queries are bundled to improve query execution performance. According to this embodiment, several views and group sizes and multiple operators/measures and/or filters can be indicated in a bundled query creating multiple stacks for each requested result. Using this approach, the indexed pointers in each interval are scanned only once aggregating the requested data based on the various views, group sizes, and the like.

Once the query is fully processed, rolled up data along the queried dimension D is available in the stack, optionally including additional measures. The rolled up data may be displayed on a graphical user interface ("GUI"), like for sample screen captures of a graphical user interface for a network traffic monitoring console according to one embodiment shown in FIG. 9A and FIG. 9B.

Figure 9A:
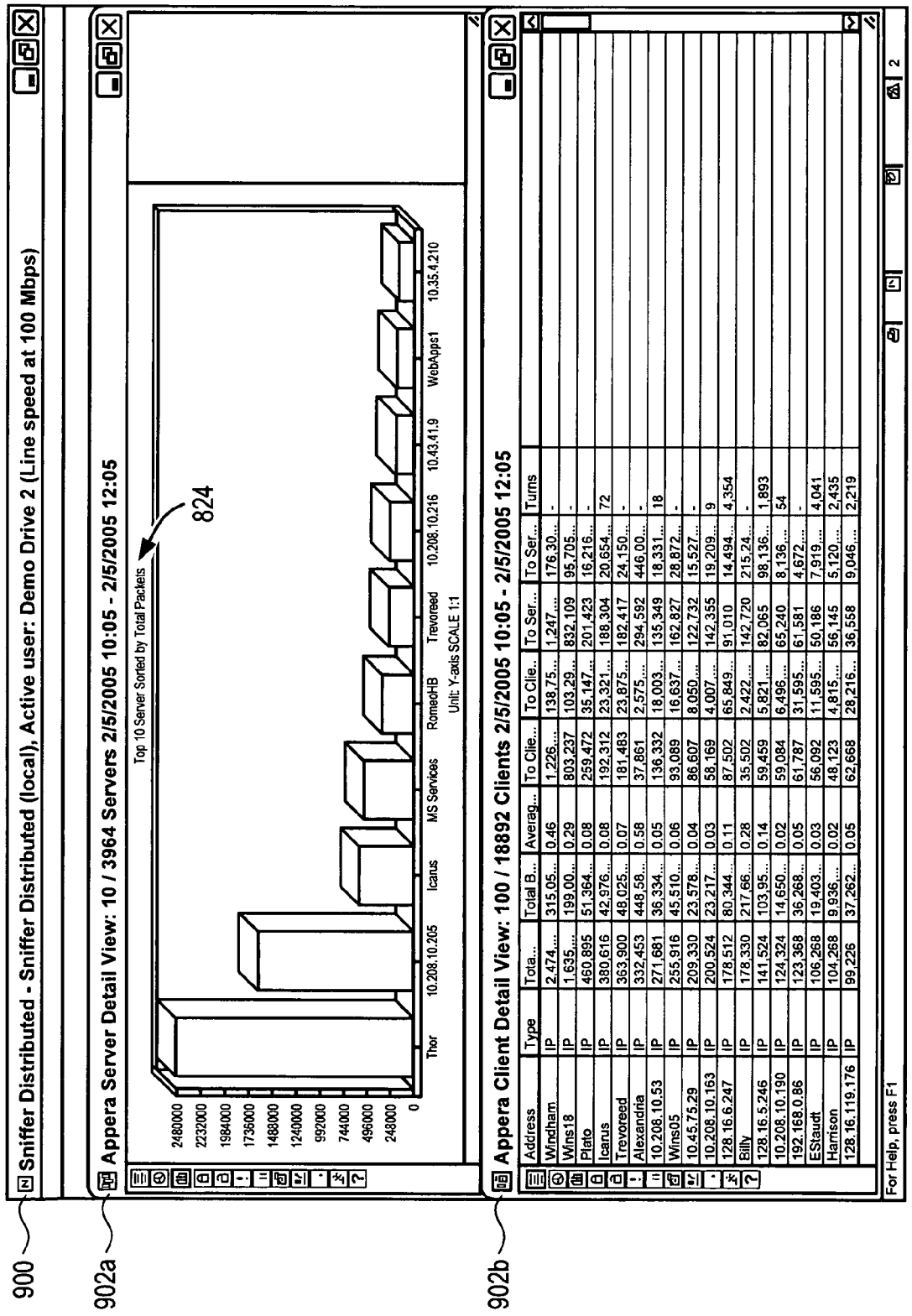
FIG. 9A and FIG. 9B show sample screen captures of a graphical user interface for a network traffic monitoring console according to one embodiment.
Figure 9B:
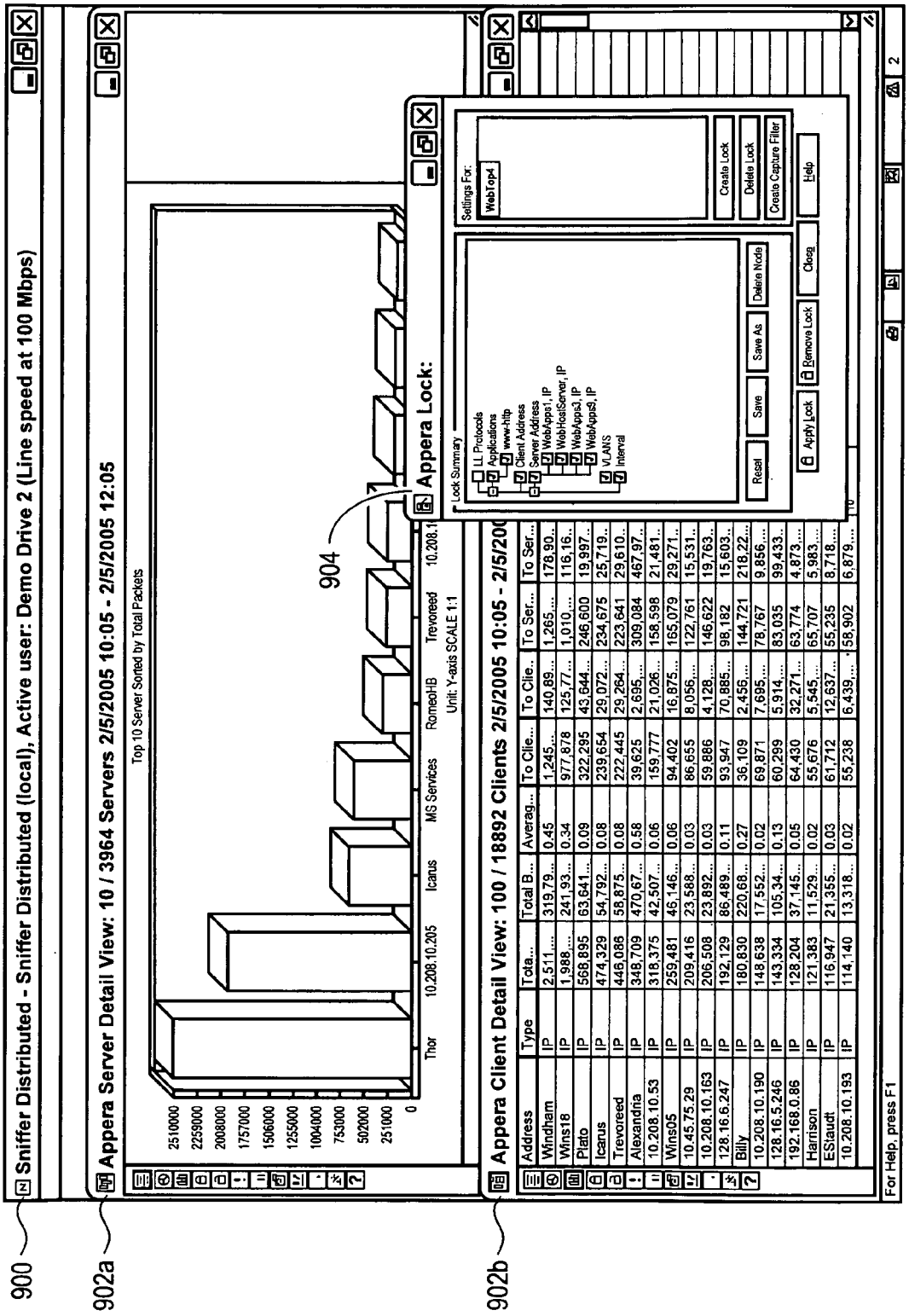

Referring now to FIG. 9A, an application window 900 for a network monitoring application, e.g., Sniffer® Distributed, displays a plurality of views 902. In one view 902a, the top 10 servers by packet size are displayed in a bar graph. The query 824 is displayed at the top of the view window. Another view window 902b shows a listing of the top 100 clients by total packets using IP protocol (filter) with additional measures, total bytes, average response time, and the like. Preferably, every time data is updated, i.e., every SI update period (e.g., one minute), the query is re-processed and the display is updated.

According to one embodiment, any number of these views 902 can be shown to display the data according to multiple query results. As mentioned above, a default set of queries can be generated automatically for the standard display in the monitoring GIU 900, e.g., top 10 clients, top 10 servers, top 10 virtual circuits, and the like. Moreover, a user menu for configuring a "lock" can be provided to modify the default queries or generate new queries to pivot the data along the dimensions and values of interest to the user. For example, with reference to FIG. 9B, in one embodiment, a window check box menu 904 is provided for the user to select dimensions and associated values with respect to which HyperLock the traffic data thereby producing a customized view of real-time traffic data (every update cycle). The new view is created virtually instantaneously upon the user's application of the lock by executing the query based on the fast index tables. More over, the view can be progressively locked to different conditions as the user drills down in the data evaluating a particular problem by simply modifying the desired checkbox in the lock menu and reapplying the lock.

According to one embodiment, as the query conditions are modified according to the user selected lock dimensions and values, a plurality of views 902 can be modified to respond to the changes in lock variables. This zoom correlation technique across multiple windows advantageously allows the user to monitor multiple aspects of network traffic simultaneously and evaluate the effects of changing lock parameters on the various views at the same time.

According to another aspect of one embodiment, lock profiles are stored with customized locks created by the user. Moreover, preferably, different view windows 902 can be associated with different user defined or default locks to provide either default or customized views of the meta-flow traffic on the monitoring console as desired by the user.

In one embodiment, the lock parameter menu is further enhanced to provide a "query service" interface. In order to support third party interfaces, a generic query interface is defined. This query interface defines the dimensions, measures, the sorting order (ascending/descending), available filter sets, and the like. A query parsing engine parses query interface generated queries and converts them into the optimized internal format. The indexing area is then scanned based on the ordered pointer fast indexing tables according to the techniques described above. The resulting data is rolled up into response buffers and output to the third party interface. Preferably, to ensure data consistency, the indexing area and fast indexing data structures are updated synchronously, using the native locking mechanisms with rollup as described above.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for monitoring network traffic, the method implemented on a computer, the method comprising:
generating two or more index tables associated with two or more time intervals, each index table comprising a set of pointers to a corresponding set of storage locations storing traffic data captured over the time interval associated with the index table, the traffic data in each set of storage locations organized in a plurality of tuples with associated network traffic measures, each tuple including a set of dimension values uniquely identifying network communications between two end-points, wherein the set of pointers are sorted in an order based on at least one of the dimension values in the tuples for the traffic data captured over the interval of time corresponding to the index table; and in response to a query with respect to a dimension requesting a time aggregated result based on the network traffic measures, aggregating partial results based on network traffic measures into the time aggregated result by accessing the storage locations storing traffic data captured over different time intervals following the order of the pointers in each index table, the aggregating performed by a processor of the computer, the aggregating further comprising:

following the order of the pointers in a first index table associated with a first time interval as long as a dimension value pointed to by each pointer is a specified dimension value; and upon reaching a pointer in the first index table pointing to a new dimension value different from the specified dimension value, following the order of the pointers in a second index table corresponding to a second time interval as long as a dimension value pointed to by each pointer is the specified dimension value.

2. The method of claim 1, wherein the storage locations comprise an indexing area wherein each set of storage locations correspond to a data bucket of a plurality of data buckets, each data bucket associated with the time interval over which the traffic data stored in the corresponding set of storage locations was captured.

3. The method of claim 2, wherein the plurality of data buckets rotate over time generating a continuous storage mechanism with a maximum storage time, a first data bucket being reused after elapsing the maximum storage time.

4. The method of claim 1, wherein the dimension values in the tuples include a value for one or more of a client, a server, a virtual circuit, a protocol, an application, an interval, or a network segment.

5. The method of claim 1, wherein each index table further comprises a plurality of arrays of pointers, each array associated with a dimension for which dimension values are included in the tuples, wherein the pointers in each array are sorted in an order based on the dimension values for the associated dimension in the tuples for the traffic data captured over the interval of time corresponding to the index table.

6. The method of claim 1, wherein aggregating partial results based on network traffic measures into the time aggregated result by accessing the storage locations storing traffic data captured over different time intervals following the order of the pointers in each index table comprises:

accessing a first set of storage locations associated with a first time interval by accessing the storage location pointed to by a first pointer in a first index table for the query dimension;

aggregating partial results based on the network traffic measures in the storage locations associated with the first time interval further associated with tuples having the first value for the query dimension;

storing the pointer value of a current pointer of the first index table in response to determining a second value different than the first value for the query dimension in a tuple pointed to by the current pointer;

accessing a second set of storage locations associated with a second time interval by accessing the storage location pointed to by a first pointer in a second index table for the query dimension;

aggregating the partial results based on the network traffic measures in storage locations associated with the second time interval further associated with tuples having the first value for the query dimension; and storing the time aggregated result upon determining a second value different than the first value for the query dimension in a tuple in a last set of storage locations associated with a last time interval.

7. The method of claim 1, wherein the query comprises a queried dimension and a measure based operator configured to provide the time aggregated result based on the network traffic measures for values of the queried dimension.

8. The method of claim 7, wherein the query further comprises a filter field, the filter field for specifying one or more of dimension values or network traffic measures based on which the operator is applied.

9. The method of claim 7, wherein the query includes one of a top number or a bottom number of the queried dimension by the operator time aggregated result.

10. A computer based system for monitoring network traffic comprising:

means for generating two or more index tables associated with two or more time intervals, each index table comprising a set of pointers to a corresponding set of storage locations storing traffic data captured over the time interval associated with the index table, the traffic data in each set of storage locations organized in a plurality of tuples with associated network traffic measures, each tuple including a set of dimension values uniquely identifying network communications between two end-points, wherein the set of pointers are sorted in an order based on at least one of the dimension values in the tuples for the traffic data captured over the interval of time corresponding to the index table;

means for receiving a query with respect to a dimension requesting a time aggregated result based on the network traffic measures; and means for aggregating partial results based on network traffic measures into the time aggregated result by accessing the storage locations storing traffic data captured over different time intervals following the order of the pointers in each index table, the means for aggregating a partial result coupled to the means for receiving a query for aggregating the partial results in response to receiving the query, the means for aggregating comprising hardware, the aggregating further comprising:

following the order of the pointers in a first index table associated with a first time interval as long as a dimension value pointed to by each pointer is a specified dimension value; and upon reaching a pointer in the first index table pointing to a new dimension value different from the specified dimension value, following the order of the pointers in a second index table corresponding to a second time interval as long as a dimension value pointed to by each pointer is the specified dimension value.

11. A computer readable storage medium for monitoring network traffic comprising:

computer program instructions for generating two or more index tables associated with two or more time intervals, each index table comprising a set of pointers to a corresponding set of storage locations storing traffic data captured over the time interval associated with the index table, the traffic data in each set of storage locations organized in a plurality of tuples with associated network traffic measures, each tuple including a set of dimension values uniquely identifying network communications between two end-points, wherein the set of pointers are sorted in an order based on at least one of the dimension values in the tuples for the traffic data captured over the interval of time corresponding to the index table; and computer program instructions for, in response to a query with respect to a dimension requesting a time aggregated result based on the network traffic measures, aggregating partial results based on network traffic measures into the time aggregated result by accessing the storage locations storing traffic data captured over different time intervals following the order of the pointers in each index table, the aggregating further comprising:

following the order of the pointers in a first index table associated with a first time interval as long as a dimension value pointed to by each pointer is a specified dimension value; and upon reaching a pointer in the first index table pointing to a new dimension value different from the specified dimension value, following the order of the pointers in a second index table corresponding to a second time interval as long as a dimension value pointed to by each pointer is the specified dimension value.

12. A network monitoring appliance for monitoring network traffic comprising:

a network data staging area configured to receive network traffic data from a packet classification and analysis engine in two or more time based data storage buckets, wherein the data storage buckets are associated with a timer for rotating the data storage buckets over time;

a network data indexing area comprising sets of storage locations for storing traffic data captured over a plurality of time intervals, the indexing area coupled to the staging area for periodically updating the traffic data in a current bucket within a time period, the indexing area further configured to store two or more index tables associated with two or more time intervals, each index table for storing a set of pointers to a corresponding set of storage locations; and a processing unit configured to receive a query from a monitoring console, the query referenced with respect to a query dimension and requesting a time aggregated result based on network traffic measures stored in the storage locations, the processing unit for aggregating partial results from each of a plurality of sets of storage locations, the partial results associated with a value for the query dimension, wherein the processing unit accesses each of the plurality of storage locations based on the pointers in the two or more index tables, the aggregating further comprising:

following the order of the pointers in a first index table associated with a first time interval as long as a dimension value pointed to by each pointer is a specified dimension value; and upon reaching a pointer in the first index table pointing to a new dimension value different from the specified dimension value, following the order of the pointers in a second index table corresponding to a second time interval as long as a dimension value pointed to by each pointer is the specified dimension value.

13. The network monitoring appliance of claim 12, wherein the staging area and the indexing area are implemented in random access memory.

14. The network monitoring appliance of claim 12, wherein each of the sets of storage locations in the indexing area are configured into a corresponding data bucket, each data bucket associated with a time interval over which the traffic data stored in the corresponding set of storage locations was captured.

15. The network monitoring appliance of claim 14, wherein the use of the plurality of data buckets rotates over time generating a continuous storage mechanism with a maximum storage time, a first data bucket being reused after elapsing the maximum storage time.

16. The network monitoring appliance of claim 12, wherein the network traffic data received from the packet classification and analysis engine is formatted into a plurality of dimension tuples and associated network traffic measures, wherein the dimensions in the tuples include one or more of a client, a server, a virtual circuit, a protocol, an application, an interval, or a network segment.

17. The network monitoring appliance of claim 16, wherein each index table further comprises a plurality of arrays of pointers, each array associated with a dimension, wherein the pointers in each array are sorted in an order based on values for the dimension in the tuples of the traffic data captured over the interval of time corresponding to the index table.

18. The network monitoring appliance of claim 12, wherein the processing unit is further configured to provide a set of default queries for selection by a user at the monitoring console.

19. The network monitoring appliance of claim 12, wherein the processing unit is further configured to aggregate partial results from each of a plurality of sets of storage locations with respect to a set of default queries.

20. The network monitoring appliance of claim 19, wherein the set of default queries are internally provided by the processing unit without being received from the monitoring console.

21. The method of claim 1, wherein each index table is re-created each time the traffic data captured over the time interval associated with the index table is updated based on newly available traffic data.

22. The method of claim 1, wherein aggregating partial results based on network traffic measures into the time aggregated result by accessing the storage locations storing traffic data captured over different time intervals following the order of the pointers in each index table further comprises:

after following the order of the pointers in the second index table as long as a dimension value pointed to by each pointer is the specified dimension value, following the order of the pointers in the first index table as long as a dimension value pointed to by each pointer is the new dimension value.

\* \* \* \* \*

UNITED STATES PATENT AND TRADEMARK OFFICE
CERTIFICATE OF CORRECTION

PATENT NO. : 7,617,314 B1  Page 1 of 1
APPLICATION NO. : 11/134808
DATED : November 10, 2009
INVENTOR(S) : Bansod et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Nineteenth Day of October, 2010

David J. Kappos
*Director of the United States Patent and Trademark Office*